Oct. 29, 1929.    A. HOLMES    1,733,597
PROCESS AND APPARATUS FOR MAKING WHITE PETROLATUM
Filed Oct. 27, 1925
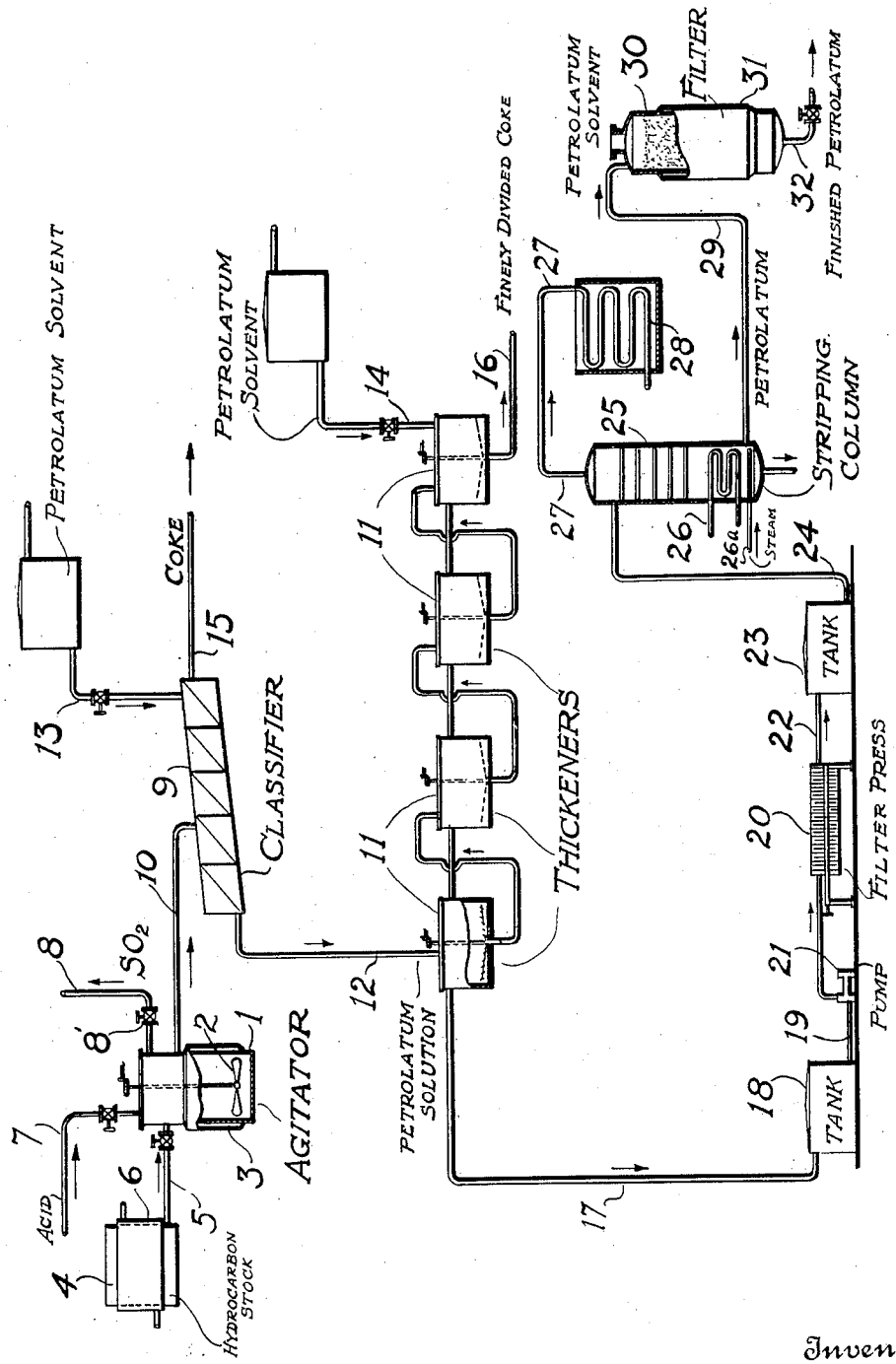
Inventor
August Holmes.
By His Attorney Patented Oct. 29, 1929

1,733,597

UNITED STATES PATENT OFFICE

AUGUST HOLMES, OF NEWARK, NEW JERSEY, ASSIGNOR TO STANDARD OIL DEVELOPMENT COMPANY, A CORPORATION OF DELAWARE

PROCESS AND APPARATUS FOR MAKING WHITE PETROLATUM

Application filed October 27, 1925. Serial No. 65,074.

This invention relates to improvements in processes and apparatus for preparing petrolatum, and the like, by acid treatment of petrolatum-yielding hydrocarbon material under conditions to convert undesirable constituents into solid carbonaceous bodies. The invention in a preferred form comprises the simultaneous extraction of the liquid and solid reaction product with a selective solvent for petrolatum.

This and other novel features of the invention will be fully understood from the following description, taken in connection with the accompanying drawing, in which the figure is a diagrammatic side elevation of equipment suitable for use in carrying out the process.

Referring to the drawing, reference numeral 1 denotes an agitator provided with a stirrer 2 and a steam jacket 3 or equivalent heating means. A tank 4 for the stock to be treated is connected by pipe 5 with the agitator 1. Heating means 6 are provided for the tank 4 for use when normally solid hydrocarbon stocks are being treated. A pipe 7 serves for the introduction of acid. A pipe 8 conducts gas, evolved in the reaction, to a suitable absorbent or recovery system (not shown). A valve 8', which may be used to regulate pressure, is installed in pipe 8.

A classifier 9, or similar means for removing the larger of the carbonaceous bodies or coke carried by the oil, receives the product from agitator 1 through pipe 10. A series of thickeners 11, or other devices for removing the bulk of the relatively finely divided carbon remaining in the oil, is connected by the pipe 12 with the classifier. A solvent for petrolatum is introduced through pipes 13 and 14 into the classifier 9 and thickener series 11 respectively at a point remote from that at which the treated product enters. Carbonaceous bodies are removed from the classifier and thickeners through pipes 15 and 16.

The petrolatum solution passes from the first thickener through pipe 17 to the tank 18 and thence through a pipe 19 to a filter press 20. A pump 21 is arranged to forward the solution through the pipe 19. The substantially carbon-free solution from the press passes through pipe 22 to the tank 23 and thence through pipe 24 to stripping column 25, or similar equipment. The column may be heated at the bottom by a steam coil 26, and live steam may be injected through pipe 26a. Vapors of the solvent, evolved in the column, pass through pipe 27 to cooler 28 and are condensed and recovered in suitable apparatus (not shown). The petrolatum is withdrawn from the stripping column 25 through pipe 29 and passes to the filter 30 charged with clay or the like. The filter may be heated by a steam jacket 31. It will be understood that appropriate provisions are made throughout the system for preventing congealing of the petrolatum. The finished product is drawn off through pipe 32.

The following example is illustrative of my invention: Crude petrolatum is melted and treated in agitator 1, or in a series of such agitators, with fuming sulfuric acid (preferably 20% oleum). The amount of acid required is largely dependent upon the amount of snow-white petrolatum product desired; in general, the greater the amount of acid, up to say 150% by volume of the petrolatum, the greater the yield of such product. Acid in about 100% by volume of the crude petrolatum will ordinarily give satisfactory yields. The process may be operated either batch or continuous, but the latter is preferred. In continuous operation a series of 3 agitators is desirable, the melted petrolatum being fed continuously through the series and a proper amount of acid added in each agitator. All the acid may be added in the first agitator, care being taken not to add it so rapidly as to cause trouble from foaming. A single agitator may of course be used in continuous operation. The treated stock in this case will be taken off progressively from an upper portion of the agitator.

The crude petrolatum and acid should be agitated together for about 16 hours, in accordance with this embodiment of the invention. The reaction is strongly exothermic and it may be necessary to provide cooling means to prevent too great a rise of temperature. However, temperatures as high as 160°–170° C. may be allowed without injury to the product. The mixtures in the agitators should be stirred briskly so as to cause the carbon formed to be in relatively finely divided condition and suspended in the petrolatum.

Ordinarily, three stages may be observed in the acid treatment. In the first stage foaming occurs until the ordinary acid sludge appears. In the second stage there is a reaction accompanied by violent evolution of sulfur dioxid, indicating the conversion from the ordinary sludge to that of the solid insoluble type characteristic of my process. In the third stage there is some further reaction accompanied by evolution of sulfur dioxid, and the mass tends to assume a pasty consistency while hot. In the absence of stirring, the mass will become solid in the third stage of the reaction. When evolution of sulfur dioxid begins to diminish, it may be assumed that the reaction is approaching completion.

The reaction mixture is then extracted with a solvent for the petrolatum. I may use various substances as solvent, for example naphtha or benzol. For best results the solvent should have a moderately high boiling point and should resist attack by sulfuric acid. Purified naphtha having a relatively high initial boiling point and a narrow boiling range is well adapted for my purpose.

The solvent is introduced through pipe 13 into the classifier 9, wherein it is mixed with the reaction product from the agitator. The coarse solids are continuously washed by the solvent and finally are withdrawn as at 15 for drying, with recovery of the solvent, or other disposal. The petrolatum solution containing suspended carbonaceous material overflows to the series of thickeners 11 in which the suspended material settles out. The solids are continuously washed countercurrently in the series of thickeners by a stream of solvent entering through pipe 14. Although a preferred method of removing the carbon is by classifying and thickening, the use of filters or other appropriate means for this purpose is not precluded.

The petrolatum solution now fairly free from solids is discharged from the thickeners to a storage tank 18 for cloudy solution, and from this tank it is discharged as required to the filter press 20 for final clarification. The clear solution passes continuously down through the stripping column 25, into which steam may be injected. In this tower the petrolatum is simultaneously freed from naphtha and subjected to a steaming operation. The naphtha is taken off through pipe 27 and recovered for further use. The removal of the solvent, like other features of the process, lends itself to various alternative procedures. For example, the solvent removal and the steaming may be carried out in separate columns, or the entire solution may be distilled in a steam still, or the naphtha may be removed in the stripping column and the steaming of the petrolatum may be conducted in batches in the steam still. I prefer, however, to operate continuously in apparatus as shown in the drawing. Steaming is not essential in all cases but usually improves the product.

The petrolatum is next passed to a filter, preferably charged with clay or other finely divided decolorizing material. Clay has been found in general to give the best results in the production of a pure white product. The stream of filtered petrolatum is interrupted at proper points to separate the various grades according to color. The liquid passing through the filter during the first part of the run is ordinarily pure white, but as the clay becomes less efficient, a progressively darker color may appear. The petrolatum may be neutralized before filtration, if necessary.

The temperature of the classifiers, thickeners and filter press should be above the cloud point of the solution. When using naphtha sufficient to make a 25% solution, the working temperature in this equipment should be above 34° C. and preferably around 38° to 44° C. The classifiers, thickeners and filter press should be gas tight to prevent loss of solvent and to reduce the fire hazard. The clay filters likewise are maintained at a temperature sufficiently high to keep the petrolatum in a melted and suitably fluent condition.

The carbonaceous bodies separated in the classifier and the thickeners are removed and are preferably dried in apparatus equipped for the recovery of the solvent carried by them. Ordinarily there is not enough carbon collected in the filter press to justify treatment for recovery of the solvent, but when desirable this carbon may be treated as above described.

The sulfur dioxide evolved during the reaction may be recovered in any suitable way, as by absorption in caustic alkali, liquefaction, etc.

While in the example given above I have referred to the use of crude petrolatum as the stock operated upon, the invention is not limited in this respect. For example, it is sometimes advantageous to conduct the reaction in the presence of a hydrocarbon, liquid at ordinary temperatures, which may or may not be affected by the acid treatment and will impart a desirable consistency to the finished petrolatum. White oils or white oil distillates are suitable for this purpose. When the liquid hydrocarbon contains acid-reactive components, these will be removed simultaneously with the purification of the petrolatum. The processes described herein may be satisfactorily conducted at atmospheric pressure, but higher or lower pressures are not precluded.

The petrolatum product is characterized by the substantial absence of coloration, taste, and odor. The product is not materially affected by exposure to air or light, even for long periods, and is not reacted upon by acids or alkalis under normal conditions. Even when treated with sulfuric acid of about 95–98% strength at temperatures of 100°C. or even higher, the white petrolatum produced by this process is not substantially darkened.

The procedures described are illustrative of preferred forms of the invention, but various modifications may be made within the scope of the appended claims, in which it is my intention to claim all novelty inherent in the invention as broadly as the prior art permits.

I claim:

1. The process of preparing petrolatum, consisting of treating a petrolatum-yielding material in liquid form with fuming sulfuric acid at an elevated temperature until undesirable constituents of the material are converted into non-liquid undissolved carbonaceous bodies suspended in the liquid, treating with a solvent for petrolatum the residual liquid and the carbonaceous bodies together, and recovering purified petrolatum from the solution.

2. The process of preparing highly purified petrolatum, consisting of treating a petrolatum-yielding material with fuming sulfuric acid at an elevated temperature until undesirable constituents of the material are converted into coke-like bodies, adding a solvent for petrolatum to the reaction mixture to form a petrolatum solution containing coke-like bodies in suspension, removing such bodies from the solution, removing the solvent, and recovering purified petrolatum.

3. The process according to claim 2, in which the coke-like bodies are removed by classifying and thickening.

4. The process according to claim 2, in which the coke-like bodies are removed by classifying and thickening while passing a countercurrent stream of a solvent for petrolatum in contact with such bodies.

5. The process of preparing highly purified petrolatum, consisting of continuously treating a petrolatum-yielding material with fuming sulfuric acid at an elevated temperature until undesirable constituents of the material are converted into coke-like bodies, continuously adding a solvent for petrolatum to the reaction mixture to form a petrolatum solution containing coke-like bodies in suspension, continuously removing such bodies from the solution, continuously removing the solvent, and continuously recovering purified petrolatum.

6. The process of preparing highly purified petrolatum, consisting of treating a petrolatum-yielding hydrocarbon material with fuming sulfuric acid at an elevated temperature until undesirable constituents of the material are converted into coke-like bodies, agitating the reaction mixture during the treating to cause such bodies to assume a finely divided and suspended condition, adding to the suspension a solvent for petrolatum, classifying and thickening the solution to remove the bulk of the coke-like bodies therefrom, filtering to remove residual solids, removing the solvent from the filtered material, and passing the petrolatum through a body of a decolorizing material.

7. The process according to claim 6, in which the petrolatum is steamed before being decolorized.

8. The process of preparing highly purified petrolatum, consisting of agitating crude petrolatum with fuming sulfuric acid, continuously passing the reaction mixture to means for separating the solids formed by the reaction, continuously introducing into such means a solvent for petrolatum, whereby the petrolatum is dissolved and substantially removed from the solids, withdrawing the solids continuously, treating the solution to remove the solvent, and continuously recovering the petrolatum.

9. The process according to claim 8, in which the petrolatum is steamed simultaneously with the treatment to remove the solvent.

10. The process of preparing highly purified petrolatum, consisting of treating a petrolatum-yielding hydrocarbon material with about 100–150% of its volume of fuming sulfuric acid at a temperature above the melting point of the petrolatum for a period of about 16 hours, whereby undesirable constituents of the material are converted into carbonaceous solids, treating the reaction product with a solvent for petrolatum, thereby forming a suspension of such solids in the resulting solution, separating the solids from the solution, and recovering purified petrolatum.

11. The process according to claim 10, in which the suspension is formed by the addition of sufficient naphtha to make about a 25% petrolatum solution.

12. Apparatus for preparing highly purified petrolatum, comprising an agitator, a classifier and thickener in series, means for conveying the reaction mixture from the agitator to the said series, means for flowing a solvent for petrolatum countercurrent to the material being extracted, through said series, a filter, means for conveying the classified and thickened solution to the filter, means connected to the filter and adapted for the removal of the solvent, and means for withdrawing the petrolatum.

13. Apparatus according to claim 12, in which a filter charged with finely divided decolorizer is provided for the treatment of the petrolatum after the removal of the solvent.

14. Apparatus according to claim 12, in which a stripping column is provided for the removal of the solvent.

15. Apparatus according to claim 12, in which a stripping column is provided for the removal of the solvent, and means for injecting steam is arranged in the lower portion of the column.

AUGUST HOLMES.